(12) United States Patent
Watamura

(10) Patent No.: US 10,250,148 B2
(45) Date of Patent: Apr. 2, 2019

(54) PRINTING APPARATUS, CONTROL METHOD THEREOF, AND POWER SUPPLY CIRCUIT THEREFOR

(71) Applicant: SEIKO EPSON CORPORATION, Tokyo (JP)

(72) Inventor: Hisashi Watamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/915,680

(22) Filed: Mar. 8, 2018

(65) Prior Publication Data

US 2018/0287502 A1 Oct. 4, 2018

(30) Foreign Application Priority Data

Mar. 28, 2017 (JP) .................. 2017-062389

(51) Int. Cl.

| | | |
|---|---|---|
| *B41J 2/045* | (2006.01) | |
| *H02M 1/08* | (2006.01) | |
| *H02M 3/335* | (2006.01) | |
| *H02M 1/00* | (2006.01) | |

(52) U.S. Cl.
CPC ....... *H02M 3/33523* (2013.01); *B41J 2/0455* (2013.01); *B41J 2/04541* (2013.01); *B41J 2/04548* (2013.01); *B41J 2/04551* (2013.01); *B41J 2/04586* (2013.01); *H02M 1/08* (2013.01); *H02M 2001/0032* (2013.01); *Y02B 70/16* (2013.01)

(58) Field of Classification Search
CPC .. B41J 2/0455; B41J 2/04586; B41J 2/04541; B41J 2/04548; B41J 2/04551; H02M 3/33523; H02M 1/08; H02M 2001/0032; Y02B 70/16
See application file for complete search history.

(56) References Cited

U.S. PATENT DOCUMENTS

2017/0288434 A1* 10/2017 Narita ................. H02J 7/0052

FOREIGN PATENT DOCUMENTS

| JP | 10-271820 A | 10/1998 |
|---|---|---|
| JP | 2000-209524 A | 7/2000 |
| JP | 2002-44942 A | 2/2002 |
| JP | 2002-314390 A | 10/2002 |
| JP | 2015-228727 A | 12/2015 |

\* cited by examiner

*Primary Examiner* — Thinh H Nguyen

(74) *Attorney, Agent, or Firm* — Workman Nydegger

(57) ABSTRACT

A printer includes a switching power supply circuit including a primary side circuit configured to perform a power switching operation, a secondary side circuit having a shunt regulator, a feedback configured to feed a comparison result between the output voltage output from the secondary side circuit and a reference voltage of the shunt regulator back to the primary side circuit to control the output voltage of the secondary side circuit, a control signal circuit configured to input a PSC signal input from an SOC to the photocoupler to control the output voltage of the secondary side circuit, and a switch circuit configured to cut off a current to be supplied to the shunt regulator in a case where the output voltage of the secondary side circuit is a low voltage in accordance with the input of the PSC signal.

7 Claims, 4 Drawing Sheets

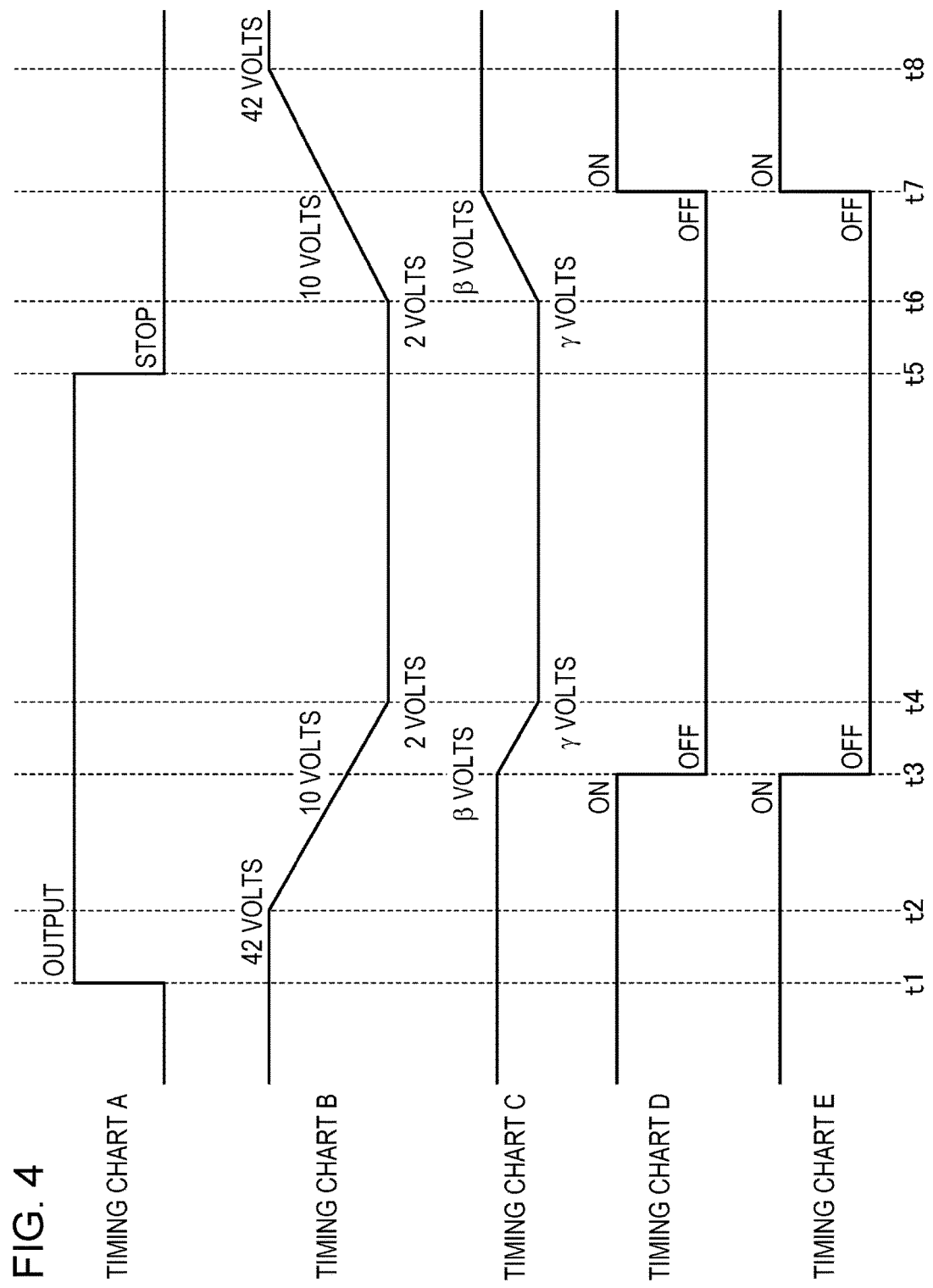

PRINTING APPARATUS, CONTROL METHOD THEREOF, AND POWER SUPPLY CIRCUIT THEREFOR

This application claims priority under 35 U.S.C. § 119 to Japanese Patent Application No. 2017-062389 filed on Mar. 28, 2017, the entire disclosure of which is expressly incorporated by reference herein.

BACKGROUND

1. Technical Field

The present invention relates to a printing apparatus, a control method thereof, and a power supply circuit therefor.

2. Related Art

In recent years, there is known a circuit that has a shunt regulator and controls a voltage to be output to a load by performing a switching operation (see, for example, JP-A-2015-228727). JP-A-2015-228727 discloses a switching power supply circuit that restrains howling noises of a transformer by dividing a current path leading to the shunt regulator into a first current path and a second current path, and by causing a current to flow into only the first current path in high-speed starting standby state and causing a current to flow into both the first current path and the second current path in a normal state.

A switching power supply circuit as described in JP-A-2015-228727 includes circuits respectively on a primary side and a secondary side and feeds a comparison result by the shunt regulator back to a primary side circuit to control an output voltage to be output from a secondary side circuit. This type of the switching power supply circuit may be configured to control the output voltage of the secondary side circuit by not only the shunt regulator but also a control signal input from the outside. The reason for this configuration is mainly to cause the output voltage of the secondary side circuit to be a low voltage. In this configuration, in a case where the output voltage of the secondary side circuit is a low voltage in accordance with a control signal input from the outside, an operation of the shunt regulator is unnecessary. As a result, in this case, if a current for the operation is supplied to the shunt regulator, the current supplied to the shunt regulator is useless.

SUMMARY

An advantage of some aspects of the invention is to appropriately control a current to be supplied to the shunt regulator in a case where the output voltage is a low voltage in accordance with the control signal input from the outside.

According to an aspect of the invention, there is provided a printing apparatus including a switching power supply circuit including a primary side circuit configured to perform a power switching operation, a secondary side circuit having a shunt regulator and configured to output an output voltage to a load side, a feedback circuit configured to feed a comparison result between the output voltage of the secondary side circuit and a reference voltage of the shunt regulator back to the primary side circuit to control the output voltage of the secondary side circuit, a control signal circuit configured to input a control signal to the feedback circuit to control the output voltage of the secondary side circuit, and a switch circuit configured to cut off a current to be supplied to the shunt regulator in a case where the output voltage of the secondary side circuit is decreased in accordance with the control signal.

In this configuration, in a case where the output voltage of the secondary side circuit is decreased, a current in this case is prevented from being uselessly supplied to the shunt regulator because the current to be supplied to the shunt regulator is cut off. In the case where the output voltage of the secondary side circuit is decreased in accordance with the control signal, it is possible to appropriately control a current to be supplied to the shunt regulator.

It is preferable that there be provided a control circuit configured to output the control signal to the control signal circuit, in which, in a case where an operation mode is at least one of an off mode or a standby mode, the control circuit outputs the control signal to the control signal circuit to decrease the output voltage of the secondary side circuit.

Accordingly, in a case where the operation mode is at least one of the off mode or the standby mode, the control circuit outputs a control signal to the control signal circuit to decrease the output voltage of the secondary side circuit. In the case where the operation mode is at least one of the off mode or the standby mode, it is possible to appropriately control a current to be supplied to the shunt regulator.

It is preferable that the switch circuit include a transistor and a plurality of resistors, and the transistor cut off the current to be supplied to the shunt regulator in a case where the output voltage of the secondary side circuit is equal to or less than a voltage corresponding to a threshold voltage defined by the plurality of resistors.

Accordingly, in a case where the output voltage of the secondary side circuit is equal to or less than a voltage corresponding to the voltage defined by the plurality of resistors, the transistor cuts off the current to be supplied to the shunt regulator. It is unnecessary to provide a configuration for controlling the transistor from the outside, and it is possible to appropriately control a current to be supplied to the shunt regulator with a simple configuration.

It is preferable that the secondary side circuit be capable of supplying a constant current to the shunt regulator through a supply resistor for supplying the current to the shunt regulator, and the switch circuit cut off the current flowing to the supply resistor in the case where the output voltage of the secondary side circuit is decreased in accordance with the control signal.

Accordingly, since a current flowing to the supply resistor is cut off, it is possible to prevent power consumption in the supply resistor. In the case where the output voltage is decreased in accordance with the control signal, it is possible to reduce power consumption of the switching power supply circuit.

According to another aspect of the invention, there is provided a control method of a printing apparatus including a switching power supply circuit including a primary side circuit configured to perform a power switching operation, a secondary side circuit having a shunt regulator and configured to output an output voltage to a load side, and a feedback circuit configured to feed a comparison result between the output voltage of the secondary side circuit and the reference voltage of the shunt regulator back to the primary side circuit to control the output voltage of the secondary side circuit, the method including: by the switching power supply circuit, inputting a control signal to the feedback circuit to control the output voltage of the secondary side circuit, and cutting off a current to be supplied to the shunt regulator in a case where the output voltage of the secondary side circuit is decreased in accordance with the control signal.

In this configuration, in a case where the output voltage of the secondary side circuit is decreased, a current in this case is prevented from being uselessly supplied to the shunt regulator because the current to be supplied to the shunt regulator is cut off. In the case where the output voltage of the secondary side circuit is decreased in accordance with the control signal, it is possible to appropriately control the current to be supplied to the shunt regulator.

It is preferable that the printing apparatus further include a control circuit configured to output the control signal to the feedback circuit, and the control circuit output the control signal to the feedback circuit to decrease the output voltage of the secondary side circuit in a case where an operation mode of the printing apparatus is at least one of off mode or standby mode.

Accordingly, in a case where the operation mode is at least one of the off mode or the standby mode, the control circuit output a control signal to the control signal circuit to decrease the output voltage of the secondary side circuit. In the case where the operation mode is at least one of the off mode or the standby mode, it is possible to appropriately control a current to be supplied to the shunt regulator.

According to still another aspect of the invention, there is provided a power supply circuit for a printing apparatus including a primary side circuit configured to perform a power switching operation, a secondary side circuit having a shunt regulator and configured to output an output voltage to a load side, a feedback circuit configured to feed a comparison result between the output voltage of the secondary side circuit and a reference voltage of the shunt regulator back to the primary side circuit to control the output voltage of the secondary side circuit, a control signal circuit configured to input a control signal to the feedback circuit to control the output voltage of the secondary side circuit, and a switch circuit configured to cut off a current to be supplied to the shunt regulator in a case where the output voltage of the secondary side circuit is decreased in accordance with the control signal.

In this configuration, in a case where the output voltage of the secondary side circuit is decreased, a current in this case is prevented from being uselessly supplied to the shunt regulator because the current to be supplied to the shunt regulator is cut off. In the case where the output voltage of the secondary side circuit is decreased in accordance with the control signal, it is possible to appropriately control the current to be supplied to the shunt regulator.

BRIEF DESCRIPTION OF THE DRAWINGS

The invention will be described with reference to the accompanying drawings, wherein like numbers reference like elements.

FIG. 4 is a timing chart showing states of respective units of a printer.

DESCRIPTION OF EXEMPLARY EMBODIMENTS

Figure 1:
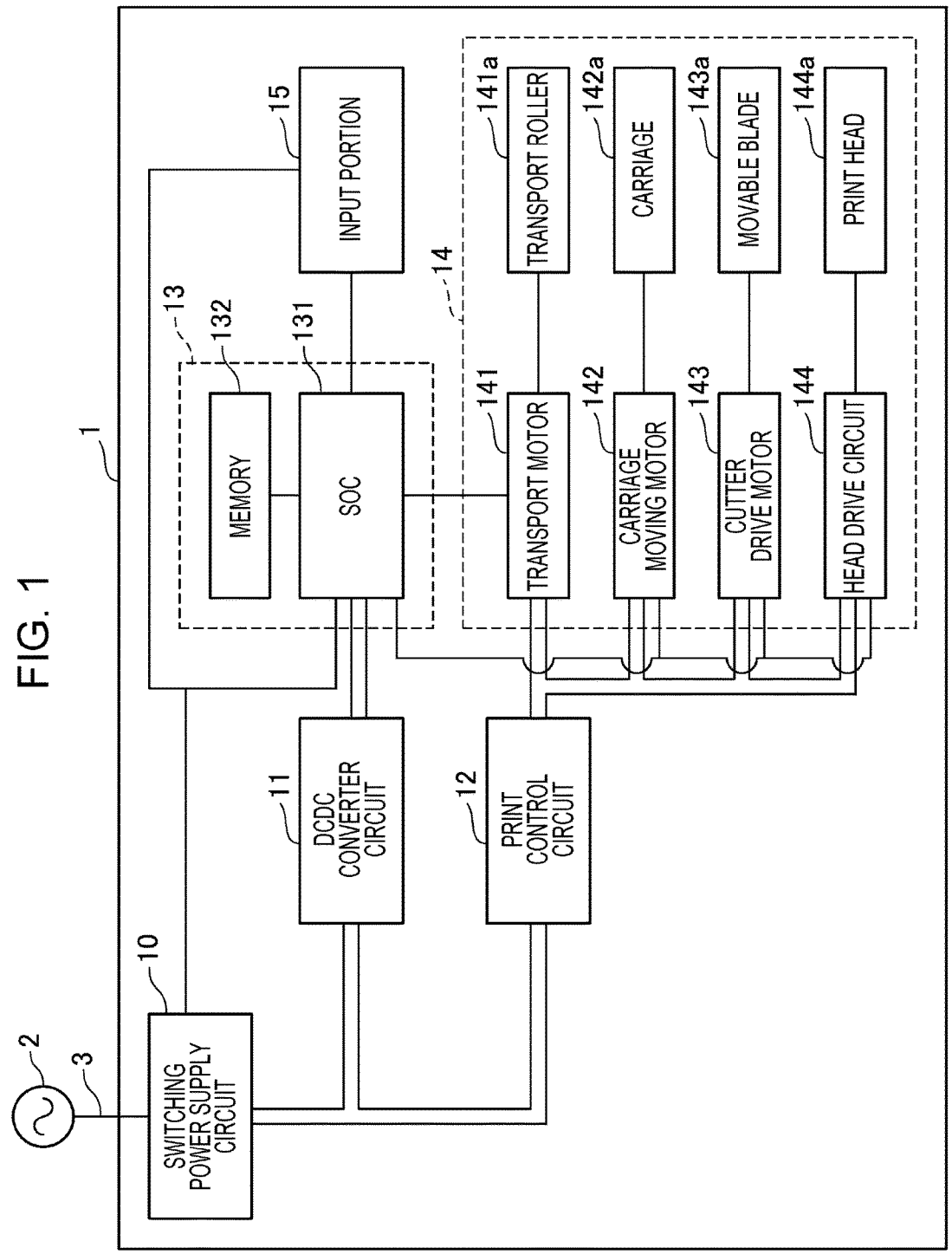
FIG. 1 is a diagram showing a configuration of a printer.

FIG. 1 is a diagram showing a configuration of a printer 1 (a printing apparatus).

As shown in FIG. 1, the printer 1 includes a switching power supply circuit 10 (a power supply circuit for the printing apparatus), a DCDC converter circuit 11 (a circuit for converting a direct current to another direct current), and a print control circuit 12.

The switching power supply circuit 10 is connected through a cable 3 to a commercial AC power supply 2. The switching power supply circuit 10 receives, for example, an AC voltage of 100 volts, rectifies, smoothes, and converts the voltage, and outputs a DC voltage of 42 volts to a load. The switching power supply circuit 10 is configured to be attachable to/detachable from the cable 3 connected to the commercial AC power supply 2. Details of the switching power supply circuit 10 will be described later. In this embodiment, the load means at least one of the DCDC converter circuit 11, the print control circuit, a logic circuit 13, and the printing mechanism 14, or a generic name obtained by summarizing these.

The DCDC converter circuit 11 steps down an input voltage and supplies the stepped down voltage to the logic circuit 13 as described later. For example, DCDC converter circuit 11 steps down the voltage of 42 volts to a voltage such as 3.3 volts or 5 volts less than 42 volts and supplies the stepped down voltage to the logic circuit 13.

The print control circuit 12 is a circuit that controls power supplied to the printing mechanism 14 on the basis of power input from the switching power supply circuit 10. For example, the print control circuit 12 receives power of 42 volts and controls power supplied to respective units of the printing mechanism 14 on the basis of an input power.

As shown in FIG. 1, the printer 1 includes the logic circuit 13, the printing mechanism 14, and an input portion 15.

The logic circuit 13 includes a System-on-a-Chip (SOC) (a control circuit) 131 (the outside) and a memory 132.

The SOC 131 is an integrated circuit that controls respective units of the printer 1. The SOC 131 includes a CPU (a processor) and the like as an arithmetic execution portion. A Read Only Memory (ROM) is connected to the SOC 131, and the ROM nonvolatilely stores a control program executable by the CPU and data relating to the control program. The SOC 131 reads and performs the control program stored in the ROM, thereby controlling respective units of the printer 1, such as controlling the printing operation by the printing mechanism 14.

The memory 132 includes a semiconductor storage element such as an EEPROM or a flash memory, or a storage medium such as a hard disk, and stores various data rewritably and nonvolatilely.

The printing mechanism 14 includes a transport motor 141, a carriage moving motor 142, a cutter drive motor 143, and a head drive circuit 144.

The transport motor 141 is a motor that rotates the transport roller 141a and the transport motor is connected to the transport roller 141a. The transport roller 141a is a roller that transports a print medium in a transporting direction. The SOC 131 outputs a drive signal to the transport motor 141 to drive the transport motor 141. The transport roller 141a is rotated in accordance with the drive of the transport motor 141, and the print medium is transported in the transporting direction in accordance with the rotation of the transport roller 141a.

The carriage moving motor 142 is a motor that moves a carriage 142a in a scanning direction intersecting the transporting direction of the print medium and the carriage moving motor is connected to the carriage 142a. The carriage 142a is supported by a carriage shaft extending in the scanning direction intersecting the transporting direction of the print medium and scans a print head 144a in the scanning direction along the carriage shaft. The SOC 131 outputs a drive signal to the carriage moving motor 142 to drive the carriage moving motor 142. In accordance with the drive of the carriage moving motor 142, the print head 144a mounted on the carriage 142a moves in the scanning direction.

The cutter drive motor 143 is a motor that moves a movable blade 143a and the cutter drive motor is connected to the movable blade 143a. The SOC 131 outputs a drive signal to the cutter drive motor 143 to drive the cutter drive motor 143. In accordance with the drive of the cutter drive motor 143, the movable blade 143a moves and cuts the print medium.

The head drive circuit 144 is connected to the print head 144a. The print head 144a is an ink jet head and includes nozzle rows of a plurality of colors (for example, four colors of CYMK (cyan, yellow, magenta, and black)). The print head 144a receives ink supplied from an ink cartridge (not shown), ejects ink from nozzles provided in respective nozzle rows, forms dots on the printed surface of the print medium, and prints characters, images, and the like. Under the control of the SOC 131, the head drive circuit 144 drives actuators provided corresponding to the nozzles of the print head 144a to eject ink from the nozzles. Dots are formed on the printed surface of the print medium in accordance with the ejection of ink from the nozzles.

The input portion 15 includes an operation switch provided in the printer 1 and an input unit such as a touch panel, detects user's operation on the input unit, and outputs the detected operation to the SOC 131. On the basis of the input from the input portion 15, the SOC 131 performs processing corresponding to the operation on the input unit.

In this embodiment, there are three operation modes of the printer 1: a normal mode, a standby mode, and an off mode.

The normal mode indicates an operation mode in which power supplied to respective units of the printer 1 is maintained and the printer 1 may perform operations such as printing and the like.

The standby mode indicates an operation mode in which the printer 1 waits for an instruction to start printing from the user. In the standby mode, for example, power supply to various motors such as the transport motor 141 included in the printing mechanism 14 is stopped. The printer 1 shifts from the normal mode to the standby mode in a case where the input portion 15 detects an instruction to shift to the standby mode on the basis of user's operation on the operation switch or in a case where a predetermined period of time elapses during which the operation such as printing is not performed in the normal mode, and so on. The standby mode is a mode in which power consumption is reduced as compared with the normal mode.

The off mode is a mode in which power consumption is further suppressed than power consumption in the standby mode. In the off mode, a power supplied to the components with large power consumption among the components of the printer 1 is stopped, and power consumption of the printer 1 is further suppressed. For example, in the off mode, a RAM constituting the SOC 131, the RAM and the memory 132 are stopped. The printer 1 shifts from the normal mode or the standby mode to the off mode in a case where the input portion 15 detects an instruction to shift to the off mode on the basis of user's operation on the operation switch.

As described above, power consumption of the printer 1 is made different in the operation modes of the printer 1. As a result, the switching power supply circuit 10 makes an output voltage to be output to the load side differently at least between normal mode, and the standby mode and the off mode. For example, in a case where the operation mode of the printer 1 is the normal mode, the switching power supply circuit 10 outputs an output voltage of 42 volts to the load side, and in a case where the operation mode of the printer 1 is the off mode, the switching power supply circuit 10 outputs the output voltage of 1.5 volts to 3 volts to the load side. The load side indicates a side on which the switching power supply circuit 10 outputs power, and the load side is a side on which the DCDC converter circuit 11, the print control circuit 12, the logic circuit 13, the printing mechanism 14, and the like are disposed.

Therefore, in the related art, the printer 1 includes a switching power supply circuit 10a that makes an output voltage to be output to a load side differently between the normal mode, and the standby mode and the off mode.

Figure 2:
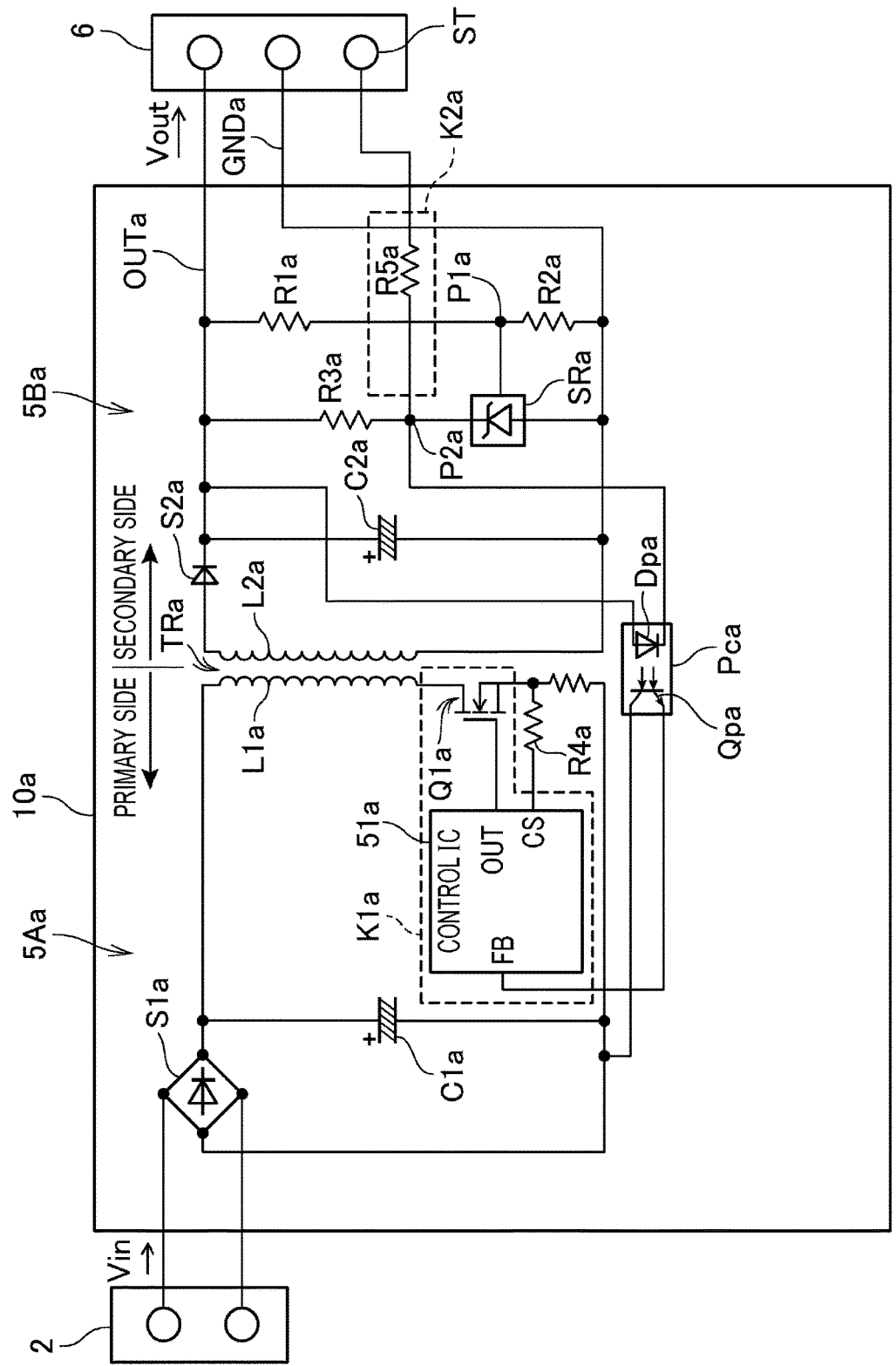
FIG. 2 is a diagram showing a configuration of a switching power supply circuit in the related art.

FIG. 2 is a diagram showing a configuration of a switching power supply circuit 10a in the related art.

As shown in FIG. 2, the switching power supply circuit 10a has a primary side circuit 5Aa and a secondary side circuit 5Ba. In the switching power supply circuit 10a, the commercial AC power supply 2 is connected to the primary side circuit 5Aa, and a load 6 is connected to the secondary side circuit 5Ba. The switching power supply circuit 10a converts an input voltage Vin input from the commercial AC power supply 2 to the primary side circuit 5Aa into an output voltage Vout and outputs the output voltage Vout to the load 6.

The primary side circuit 5Aa has a rectifier circuit S1a, which is connected to the commercial AC power supply 2, and an electrolytic capacitor C1a, a primary winding L1a of a transformer TRa, and a switching circuit K1a. In the primary side circuit 5Aa, the input voltage Vin, which is an AC voltage, is rectified and smoothed by the rectifier circuit S1a and the electrolytic capacitor C1a. Furthermore, the primary side circuit 5Aa is configured as a switching type circuit in which the voltage applied to the primary winding L1a is controlled with the switching operation of the switching circuit K1a.

The switching circuit K1a includes a control IC (an Integrated Circuit) 51a and a transistor Q1a. In this embodiment, a FET is used for the transistor Q1a. The control IC 51a changes the voltage to be input to the gate of the transistor Q1a in accordance with the output of a photocoupler Pca as described later. Specifically, the control IC 51a outputs a pulse voltage to the gate of the transistor Q1a to turn ON/off the transistor Q1a. Accordingly, the transistor Q1a performs a switching operation of ON/OFF operations. The control IC 51a controls ON/off periods of the transistor Q1a by controlling a pulse width in accordance with the output of the photocoupler Pca. The control IC 51a includes an FB terminal to which a feedback voltage as described later is applied, an OUT terminal to output a pulse voltage to the gate of the transistor Q1a, and a CS terminal to which a detection voltage indicating the detection result of an output current is applied. That the switching circuit K1a performs the switching operation corresponds to the notion that the primary side circuit 5Aa performs the switching operation.

The secondary side circuit 5Ba includes a secondary winding L2a, which is a secondary winding of the transformer TRa, and a rectifier element S2a and an electrolytic capacitor C2a. In a case where a voltage is applied to the primary winding L1a of the primary side circuit 5Aa, a voltage corresponding to the ratio of the number of windings of the primary winding L1a to the number of windings of the secondary winding L2a is induced in the secondary winding L2a. The voltage induced in the secondary winding L2a is rectified and smoothed by the rectifier element S2a and the electrolytic capacitor C2a, and is output to the load 6.

In the switching power supply circuit 10a, in a case where the voltage applied to the primary winding L1a changes with the switching operation of the switching circuit K1a, the voltage induced in the secondary winding L2a changes and the output voltage Vout of the secondary side circuit 5Ba changes.

The secondary side circuit 5Ba includes a resistor R1a and a resistor R2a between the output terminal OUTa and the output terminal GNDa. The resistor R1a and the resistor R2a are connected in series. One end of the resistor R1a is connected to the output terminal OUTa and the other end of the resistor R1a is connected to one end of the resistor R2a at the node P1a. One end of the resistor R2a is connected to the resistor R1a at the node P1a and the other end of the resistor R2a is connected to the output terminal GNDa.

The shunt regulator SRa, which is a type of a voltage regulator for maintaining a voltage constantly, is connected to the node P1a. The shunt regulator SRa internally includes a reference voltage circuit that generates a predetermined reference voltage such as 2.5 volts. The shunt regulator SRa is constituted with, for example, an IC, and compares a voltage (hereinafter, referred to as a "P1a voltage") at the node P1a with the reference voltage generated by the internal reference voltage circuit, the P1a voltage being obtained by dividing a voltage across the secondary winding L2a by the resistor R1a and the resistor R2a. Here, the P1a voltage is a voltage obtained by dividing the output voltage Vout by the resistor R1a and the resistor R2a. The cathode of the shunt regulator SRa is connected to one end of the resistor R3 at the node P2a, and the anode of the shunt regulator SRa is connected to the output terminal GNDa.

One end of a resistor R3a (a supply resistor) is connected to the node P2a. The resistor R3a is a resistor for supplying a constant current to the shunt regulator SRa, one end of the resistor R3a is connected to the cathode of the shunt regulator SRa at the node P2a, and the other end of the resistor R3a is connected to the output terminal OUTa.

In general, the shunt regulator SRa needs to be supplied with a current having a current value (for example, 1 mA) equal to or more than a predetermined current value in order to ensure the accuracy of an operation (generating or comparing a reference voltage and the like). The resistance value of the resistor R3 is a resistance value that makes it possible to supply a current having a sufficient current value (for example, 1 mA) to the shunt regulator SRa in order to ensure the accuracy of the operation of the shunt regulator SRa.

A light emitting diode Dpa of a photocoupler Pca (a feedback circuit) is connected between the cathode of the shunt regulator SRa and the output terminal OUTa.

In a case where the output voltage Vout of the secondary side circuit 5Ba rises and the P1a voltage exceeds the reference voltage, the shunt regulator SRa causes a current to flow in a direction from the cathode to the anode. Accordingly, the shunt regulator SRa supplies a current to the light emitting diode Dpa constituting the photocoupler Pca. In a case where current flows through the light emitting diode Dpa, the light emitting diode Dpa emits light. The light emitted from the light emitting diode Dpa is received by the phototransistor Qpa constituting the photocoupler Pc together with the light emitting diode Dpa. In a case where the phototransistor Qpa receives the light emitted from the light emitting diode Dpa, a feedback current flows between the collector and the emitter of the phototransistor Qpa. In a case where a feedback current flows through the phototransistor Qpa, a feedback voltage on the basis of the feedback current is applied to the FB terminal of the control IC 51a. On the basis of the feedback voltage applied to the FB terminal, the control IC 51a controls a pulse to be output to the transistor Q1a to drop the output voltage Vout so that the voltage applied to the primary winding L1a decreases.

On the other hand, in a case where the output voltage Vout drops and the P1a voltage is less than the reference voltage, the shunt regulator SRa does not cause a current flowing through the photocoupler Pca. Therefore, no feedback current flows between the collector and the emitter of the phototransistor Qpa. Accordingly, the control IC 51a controls the transistor Q1a to raise the output voltage Vout so that the voltage applied to the primary winding L1a increases.

That the photocoupler Pca applies the feedback voltage to the FB terminal and does not apply the feedback voltage to the FB terminal corresponds to the notion that the photocoupler Pca feeds a comparison result between the P1a voltage and the reference voltage of the shunt regulator SRa back to the primary side circuit 5Aa.

In this manner, the shunt regulator SRa drops the output voltage Vout in a case where the P1a voltage exceeds the reference voltage, and raises the output voltage Vout in a case where the P1a voltage is less than the reference voltage. Namely, the shunt regulator SRa performs constant voltage control for controlling the output voltage Vout so that the output voltage Vout becomes a constant voltage, by controlling the output voltage Vout such that the P1a voltage and the reference voltage are equal.

As described above, the control IC 51a includes the CS terminal. A resistor R4a is connected to the CS terminal. A current corresponding to the ratio of the number of windings of the primary winding L1a to the number of windings of the secondary winding L2a flows through the resistor R4a with respect to the output current. The resistor R4a converts the current into a voltage, and the voltage is applied to the CS terminal as a detection voltage indicating the detection result of the output current. The control IC 51a compares the detection voltage applied to the CS terminal with the feedback voltage applied to the FB terminal and sets a period during which the transistor Q1a is turned on based on the comparison result.

The control signal circuit K2a is connected to the node P2a. The control signal circuit K2a has a resistor R5. One end of the resistor R5a is connected to the node P2a and the other end of the resistor R5a is connected to a control terminal ST. The control terminal ST is a terminal controlled by the SOC 131 or the input portion 15. The SOC 131 or the input portion 15 inputs a PSC signal (a control signal) having a predetermined voltage level to the control terminal ST. The control signal circuit K2a controls the output voltage Vout of the secondary side circuit 5Ba by outputting a PSC signal input through the control terminal ST from the SOC 131 to the photocoupler Pca.

For example, in a case where the SOC 131 or the input portion 15 input a PSC signal having a "Low" level to the control terminal ST, the control signal circuit K2a outputs the PSC signal to the photocoupler Pca. In a case where the PSC signal having the "Low" level is input, Photocoupler Pca causes a current to flow through the light emitting diodes Dpa. Accordingly, the light emitting diode Dpa constituting the photocoupler Pca emits light. Then, as described above, phototransistor Qpa causes the feedback current to flow between the collector and emitter of the phototransistor Qpa, by receiving the light emitted from the light emitting diode Dpa. Then, the feedback voltage is applied to the FB terminal, and on the basis of the feedback voltage applied to the FB terminal, control IC 51a controls the pulse to be output to the transistor Q1a to drop the output voltage Vout so that the voltage applied to the primary winding L1a decreases.

In a case where the operation mode of the printer 1 is the standby mode or the off mode, the SOC 131 inputs the PSC signal having a "Low" level to the control signal circuit K2a. Accordingly, since the SOC 131 drops the output voltage Vout of the secondary side circuit 5Ba as described above, it is possible to cause the output voltage Vout to be a low voltage. In this embodiment, the low voltage is a voltage less than the output voltage Vout of the switching power supply circuit 10 in the normal mode, and more particularly, the low voltage is an output voltage Vout output from the switching power supply circuit 10 in the standby mode or the off mode.

Here, in a case where the output voltage Vout of the secondary side circuit 5Ba is a low voltage in accordance with the PSC signal, it is unnecessary to control the output voltage Vout by the shunt regulator SRa because the output voltage Vout is controlled by a PSC signal. Thus, in a case where the output voltage Vout of the secondary side circuit 5B is a low voltage in accordance with the PSC signal, supplying a current for the operation through a resistor R3a to the shunt regulator SRa corresponds to uselessly supplying a current to the shunt regulator SRa. In a case where the output voltage Vout of the secondary side circuit 5Ba is a low voltage by the PSC signal for supplying a current through the resistor R3a to the shunt regulator SRa, there is useless power consumption in a resistor R3a. Further, as described above, the resistor R3a and the resistor R5a are connected to the node P2a. As a result, if a current is supplied through the resistor R3a to the shunt regulator Sra in a case where the output voltage Vout of the secondary side circuit 5Ba is a low voltage in accordance with the PSC signal, the current flows through the resistor R5a and then power consumption in the resistor R5a is also useless.

Therefore, the switching power supply circuit 10 in this embodiment includes the following configuration.

Figure 3:
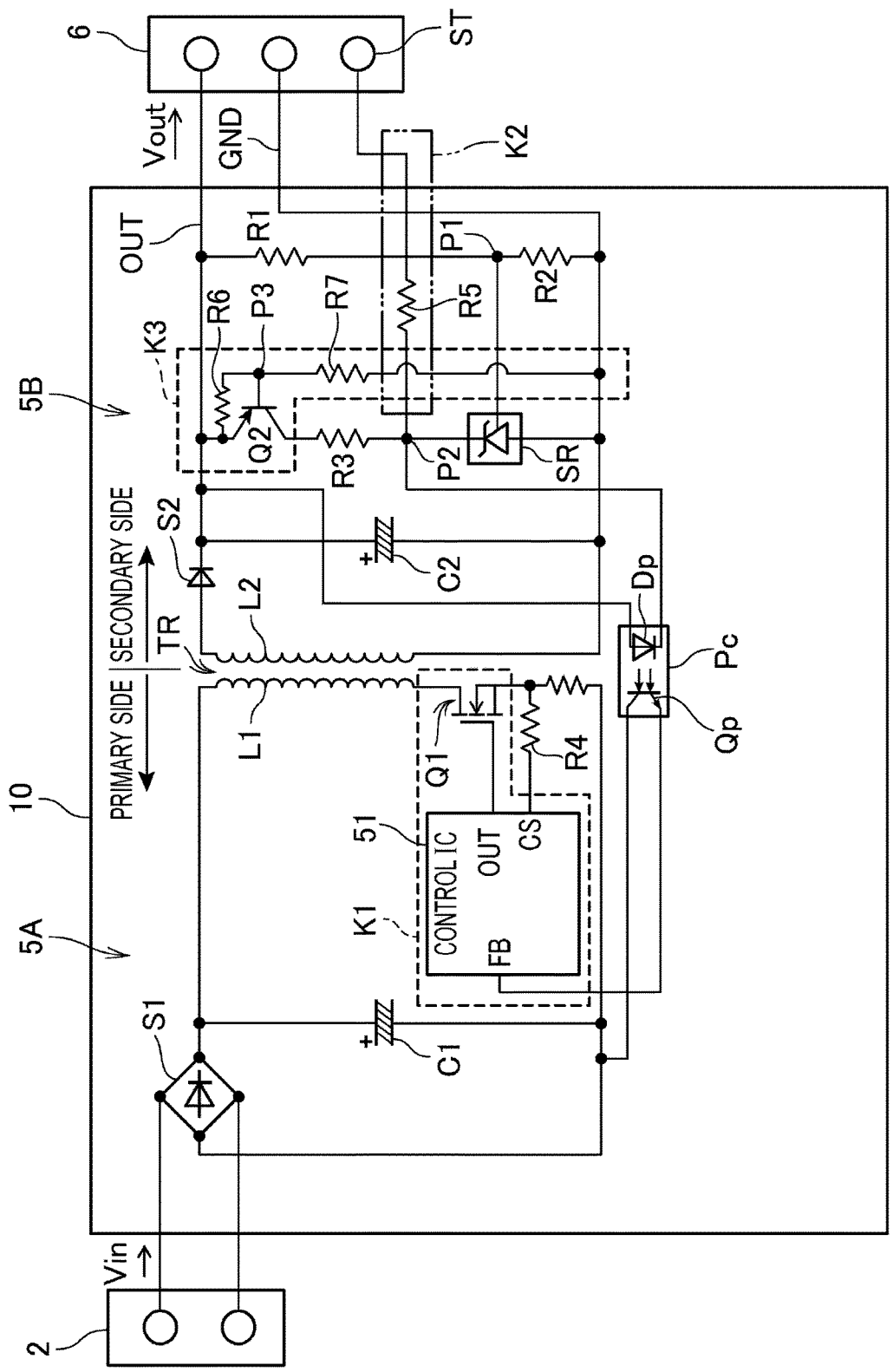
FIG. 3 is a diagram showing a configuration of a switching power supply circuit according to an embodiment.

FIG. 3 is a diagram showing a configuration of a switching power supply circuit 10 in this embodiment.

As shown in FIG. 3, the switching power supply circuit 10 has a primary side circuit 5A and a secondary side circuit 5B. The primary side circuit 5A of the switching power supply circuit 10 is connected to the commercial AC power supply 2, and the secondary side circuit 5B thereof is connected to the load 6. The switching power supply circuit 10 converts an input voltage Vin input from the commercial AC power supply 2 to the primary side circuit 5A into the output voltage Vout, and outputs the output voltage Vout to the load 6.

The primary side circuit 5A includes a rectifier circuit S1, which is connected to a commercial AC power supply 2, and an electrolytic capacitor C1, a primary winding L1 of the transformer TRa, and a switching circuit K1. The rectifier circuit S1 corresponds to the rectifier circuit S1a in FIG. 2. The electrolytic capacitor C1 corresponds to the electrolytic capacitor C1a in FIG. 2. The transformer TR corresponds to the transformer TRa in FIG. 2. The switching circuit K1 corresponds to the switching circuit K1a in FIG. 2.

The switching circuit K1 includes a control IC 51 corresponding to the control IC 51a in FIG. 2, and a transistor Q1 corresponding to the transistor Q1a in FIG. 2. In this embodiment, a FET is used for the transistor Q1. The control IC 51 outputs a pulse voltage to the gate of the transistor Q1, thereby turning ON/off the transistor Q1. Accordingly, the transistor Q1 performs a switching operation. The control IC 51 controls ON/off periods of the transistor Q1 by controlling a pulse width in accordance with the output of the photocoupler Pc corresponding to the photocoupler Pca in FIG. 2. The control IC 51 includes an FB terminal to which the feedback voltage is applied, an OUT terminal to output a pulse voltage to the gate of the transistor Q1, and the CS terminal to which the detection voltage indicating the detection result of the output current is applied. That the switching circuit K1 performs a switching operation corresponds to the notion that the primary side circuit 5A performs a switching operation.

The secondary side circuit 5B includes a secondary winding L2, which is a secondary winding of the transformer TR, and the rectifier element S2 and an electrolytic capacitor C2. The secondary winding L2 corresponds to the secondary winding L2a in FIG. 2, the rectifier element S2 corresponds to the rectifier element S2a in FIG. 2, and the electrolytic capacitor C2 corresponds to the electrolytic capacitor C2a in FIG. 2. In a case where the voltage is applied to the primary winding L1 of the primary side circuit 5A, a voltage corresponding to the ratio of the number of windings of the primary winding L1 to the number of windings of the secondary winding L2 is induced in the secondary winding L2. The voltage induced in the secondary winding L2 is rectified and smoothed by the rectifier element S2 and an electrolytic capacitor C2, and is output to the load 6.

In the switching power supply circuit 10, similarly to the switching power supply circuit 10a in FIG. 2, in a case where the voltage applied to the primary winding L1 changes with the switching operation of the switching circuit K1, the voltage induced in the secondary winding L2 changes and the output voltage Vout of the secondary side circuit 5B changes.

The secondary side circuit 5B includes a resistor R1 and a resistor R2 between the output terminal OUT and the output terminal GND. The output terminal OUT corresponds to the output terminal OUTa in FIG. 2, the output terminal GND corresponds to the output terminal GNDa in FIG. 2, and the resistor R1 corresponds to the resistor R1a in FIG. 2, and the resistor R2 corresponds to the resistor R2a. The resistor R1 and the resistor R2 are connected in series. One end of the resistor R1 is connected to the output terminal OUT, and the other end of the resistor R1 is connected to one end of the resistor R2 at a node P1. One end of the resistor R2 is connected to the resistor R1 at the node P1, and the other end of the resistor R2 is connected to the output terminal GND.

The shunt regulator SR corresponding to the shunt regulator SRa in FIG. 2 is connected to the node P1. The shunt regulator SR includes a reference voltage circuit that generates a predetermined reference voltage. The shunt regulator SR is constituted with, for example, an IC and compares a voltage (hereinafter, referred to as a "P1 voltage") at the node P1 with the reference voltage generated by the internal reference voltage circuit, the P1 voltage being obtained by dividing the voltage across the secondary winding L2 by the resistor R1 and the resistor R2. Here, the P1 voltage is a voltage obtained by dividing the output voltage Vout by the resistor R1 and the resistor R2. The cathode of the shunt regulator SR is connected to the node P2, and the anode of the shunt regulator SR is connected to the output terminal GND.

One end of the resistor R3 (a supply resistor) corresponding to the resistor R3a in FIG. 2 is connected to the node P2. The resistor R3 is a resistor for supplying a constant current to the shunt regulator SR, and one end of the resistor R3 is connected through the node P2 to the cathode of the shunt regulator SR.

A light emitting diode Dp of a photocoupler Pc (a feedback circuit) is connected between the cathode of the shunt regulator SR and the output terminal OUT. The light emitting diode Dp corresponds to the light emitting diode Dpa in FIG. 2.

In a case where the output voltage Vout of the secondary side circuit 5B rises and the divided voltage exceeds the reference voltage, the shunt regulator SR causes a current to flow in the direction from the cathode to the anode. Accordingly, the shunt regulator SR supplies a current to the light emitting diode Dp of the photocoupler Pc. Accordingly, the light-emitting diode Dp constituting the photocoupler Pc emits light. The light emitted from the light-emitting diode Dp is received by the phototransistor Qp constituting the photocoupler Pc together with the light emitting diode Dp. The phototransistor Qp corresponds to the phototransistors Qpa in FIG. 2. In a case where the phototransistor Qp receives the light emitted from the light emitting diode Dp, a feedback current flows between the collector and the emitter of the phototransistor Qp. In a case where a feedback current flows through the phototransistor Qp, a feedback voltage on the basis of the feedback current is applied to the FB terminal of the control IC 51. On the basis of the feedback voltage applied to the FB terminal, the control IC 51 controls a pulse to be output to the transistor Q1 to drop the output voltage Vout so that the voltage applied to the primary winding L1 decreases.

On the other hand, in a case where the output voltage Vout drops and the divided voltage is less than the reference voltage, the shunt regulator SR does not cause a current to flow through the photocoupler Pc. Therefore, no feedback current flows between the collector and the emitter of the phototransistor Qp. Accordingly, the control IC 51 controls the transistor Q1 so that the voltage applied to the primary winding L1 increases, and increases the output voltage Vout.

That the photocoupler Pc applies the feedback voltage to the FB terminal and does not apply the feedback voltage to the FB terminal corresponds to the notion that the photocoupler Pc feeds a comparison result between the P1 voltage and the reference voltage of the shunt regulator SR back to the primary side circuit 5A.

In this manner, the shunt regulator SR, similarly to the shunt regulator SRa in FIG. 2, performs constant voltage control.

As described above, the control IC 51 includes the CS terminal. The resistor R4 corresponding to the resistor R4a is connected to the CS terminal. A current corresponding to the ratio of the number of windings of the primary winding L1 to the number of windings of the secondary winding L2 flows through the resistor R4 with respect to the output current. The resistor R4 converts the current into a voltage, and the voltage is applied to the CS terminal as a detection voltage indicating the detection result of the output current. The control IC 51 compares the detection voltage applied to the CS terminal with the feedback voltage applied to the FB terminal and sets a period during which the transistor Q1 is turned on based on the comparison result.

The control signal circuit K2 corresponding to control signal circuit K2a in FIG. 2 is connected to the node P2. The control signal circuit K2 has a resistor R5 corresponding to the resistor R5a in FIG. 2. One end of the resistor R5 is connected to the node P2 and the other end of the resistor R5 is connected to the control terminal ST. The SOC 131 or the input portion 15 inputs a PSC signal (a control signal) having a predetermined voltage level to the control terminal ST. The control signal circuit K2, similarly to the control signal circuit K2a in FIG. 2, controls the output voltage Vout of the secondary side circuit 5B by outputting a PSC signal input from the SOC 131 or the input portion 15 through the control terminal ST to the photocoupler Pc.

As shown in FIG. 3, the switch circuit K3 is connected between the output terminal OUT and the output terminal GND. The switch circuit K3 has a transistor Q2, a resistor R6, a resistor R7. In this embodiment, a pnp type of bipolar transistor is used for the transistor Q2. The emitter of the transistor Q2 is connected to the output terminal OUT, the base of the transistor Q2 is connected to the node P3, and the collector of the transistor Q2 is connected to one end of the resistor R3. One end of the resistor R6 and one end of the resistor R7 are connected to the node P3. One end of the resistor R6 is connected to the emitter of the transistor Q2, and the other end of the resistor R6 is connected to the node P3. One end of the resistor R7 is connected to the node P3, and the other end of the resistor R7 is connected to the output terminal GND. Namely, the resistor R6 and the resistor R7 are connected in series.

On the basis of the voltage output to the base, the transistor Q2 performs ON/OFF operations. In this context, the voltage output to the base is the voltage at the node P3. The voltage at the node P3 is a voltage at which the output voltage Vout is divided by the resistor R6 and the resistor R7, and the voltage is clamped by a saturation voltage between the base and emitter of the transistor Q2 (hereinafter, referred to as a P3 voltage). In a case where the P3 voltage exceeds a predetermined voltage, the transistor Q2 performs ON operation, and in a case where the P3 voltage is equal to or less than the predetermined voltage, the transistor Q2 performs OFF operation. The P3 voltage on the boundary of ON/OFF operations is referred to as a "threshold voltage" in the following description. The threshold voltage on the boundary of ON/OFF operations of the transistor Q2 is defined by the resistance values of the resistor R6 and the resistor R7. For this embodiment, in a case where the output voltage Vout is 10 volts or less, it is assumed to set resistance values of the resistor R6 and the resistor R7 such that the P3 voltage is a threshold voltage at which the transistor Q2 performs OFF operation.

Then, the operation of the printer 1 having a switching power supply circuit 10 according to this embodiment will be described.

FIG. 4 is a timing chart showing the states of the respective units of the printer 1 including the respective units of the switching power supply circuit 10 in this embodiment. The timing chart A as shown in FIG. 4 shows states controlled by the SOC 131 and the input portion 15. The timing chart B as shown in FIG. 4 shows states of the output voltage Vout of the secondary side circuit 5B. The timing chart C as shown in FIG. 4 shows states of the P3 voltage. The timing chart D as shown in FIG. 4 shows ON/off state of the transistor Q2. The timing chart E as shown in FIG. 4 shows states of a current flowing to the resistor R3.

In the description of FIG. 4, the operation mode of the printer 1 is assumed to be the normal mode in the beginning of respective timing charts. In the description of FIG. 4, in a case where the operation mode of the printer 1 is the normal mode, the output voltage Vout is assumed to be 42 volts (V). In the description of FIG. 4, in a case where the operation mode of the printer 1 is assumed to be the off mode, the output voltage Vout is assumed to be 2 volts.

At a timing t1, the operation mode of the printer 1 is started to shift from the normal mode to the standby mode or the off mode. As described above, in a case where the input portion 15 detects an instruction to shift to the standby mode on the basis of user's operation on the operation switch or in a case where a predetermined period of time elapses during which the operation such as printing is not performed in the normal mode, the operation mode of the printer 1 shifts from the normal mode to the standby mode. As described above, in a case where the input portion 15 detects an instruction to shift to the off mode on the basis of user's operation on the operation switch, the operation mode of the printer 1 shifts from the normal mode to the off mode.

As shown in the timing chart A of FIG. 4, in a case where the operation mode of the printer 1 is started to shift from the normal mode to the standby mode or the off mode, at the timing t1, SOC 131 outputs a PSC signal having a "Low" level to the control terminal ST.

In a case where, at the timing t1, the SOC 131 outputs the PSC signal to the control terminal ST, the control signal circuit K2 outputs the PSC signal having the "Low" level to the photocoupler Pc. The photocoupler Pc causes a current to flow through the light emitting diode Dp constituting the photocoupler Pc in a case where the PSC signal having the "Low" level is input thereto. Accordingly, the light-emitting diode Dp constituting the photocoupler Pc emits light. In a case where the light emitting diode Dp emits light, the phototransistor Qp receives light emitted from the light emitting diode Dp. In a case where the phototransistor Qp receives the light, a feedback current flows between the collector and the emitter of the phototransistor Qp. Then, the feedback voltage is applied to the FB terminal, and on the basis of the feedback voltage applied to the FB terminal, control IC 51 controls the pulse to be output to the transistor Q1 so that the voltage applied to the primary winding L1 decreases.

If the voltage applied to the primary winding L1 decreases, as shown in the timing chart B of FIG. 4, at timing t2, the output voltage Vout drops from 42 volts.

After timing t2, the output voltage Vout drops from 42 volts.

After timing t2, the output voltage Vout is dropping, and at a timing t3, the output voltage Vout is dropped to 10 volts. Then, as shown in the timing chart C of FIG. 4, the P3 voltage maintains the saturation voltage between the base and emitter of the transistor Q2 until the timing t3. Here, in a case where the output voltage Vout is 10 volts, β volts is a voltage value of the P3 voltage that is obtained by dividing the output voltage Vout by the resistor R6 and the resistor R7 and is a threshold voltage in this embodiment.

As described above, for this embodiment, in a case where the output voltage Vout is 10 volts or less, resistance values of the resistor R6 and resistor R7 are set such that the P3 voltage is a threshold voltage at which the transistor Q2 performs OFF operation. Thus, in a case where the P3 voltage is less than the saturation voltage between the base and the emitter of the transistor Q2, as shown in the timing chart D of FIG. 4, at the timing t3, the transistor Q2 performs OFF operation. In a case where the transistor Q2 performs OFF operation, as shown in the timing chart E in FIG. 4, at the timing t3, a current flowing to the resistor R3 is cut off.

After the timing t3, the transistor Q2 performs OFF operation. After the timing t3, a current flowing to the resistor R3 is cut off.

After the timing t3, in a case where the output voltage Vout further drops, as shown in the timing chart A in FIG. 4, the output voltage Vout drops to 2 volts. Due to the drop of the output voltage Vout, at a timing t4, the P3 voltage drops to γ volts. Here, in a case where the output voltage Vout is 2 volts, γ volts is a voltage value of the P3 voltage obtained by dividing the output voltage by the resistor R6 and resistor R7. The voltage value of γ volts is less than β volts, and is approximately 0 volts. Also, at the timing t4, since the P3 voltage is less than β volts, the transistor Q2 performs OFF operation. Then, the current flowing to the resistor R3 remains cut off.

In this manner, in a case where the output voltage Vout of the secondary side circuit 5B is a low voltage in accordance with the input of the PSC signal, the current flowing to the resistor R3 is cut off. Namely, in a case where the output voltage Vout of the secondary side circuit 5B is a low voltage in accordance with the input of the PSC signal, the switch circuit K3 including the transistor Q2 cuts off a current to be supplied to the shunt regulator SR to cause a current flowing to the resistor R5 to decrease.

As described above, in a case where the output voltage Vout of the secondary side circuit 5B is a low voltage in accordance with the PSC signal, it is unnecessary to control the output voltage Vout by the shunt regulator SRa because the output voltage Vout is controlled by the PSC signal. As described above, in a case where the output voltage Vout of the secondary side circuit 5B is a low voltage in accordance with the PSC signal, the transistor Q2 performs OFF operation to cause a current flowing to the resistor R3 to be cut off and a current to be supplied to the shunt regulator SR to be cut off so that a current flowing to the resistor R5 decreases. Accordingly, in a case where the output voltage Vout of the secondary side circuit 5B is a low voltage in accordance with the PSC signal, it is possible to prevent a current from being useless supplied to the resistor R5 and the shunt regulator SR by the switching power supply circuit 10.

In a case where the output voltage Vout of the secondary side circuit 5B is a low voltage in accordance with the PSC signal, the transistor Q2 cuts off a current flowing to the resistor R3 to cause a current to be supplied to the shunt regulator SR to be cut off. Namely, in a case where the output voltage Vout of the secondary side circuit 5B is a low voltage in accordance with the PSC signal, there is no useless power consumption in the resistor R3. Since a current flowing to the resistor R3 is cut off, a current is prevented from flowing to the resistor R5 as well. Therefore, in a case where the output voltage Vout of the secondary side circuit 5B is a low voltage in accordance with the PSC signal, there is no useless power consumption in the resistor R5. Since the current to the resistor R5 decreases, the output voltage Vout decreases. As the output voltage Vout decreases, the current to the resistor R1 and the resistor R2 decreases. Therefore, in a case where the output voltage Vout of the secondary side circuit 5B is a low voltage in accordance with the PSC signal, the switching power supply circuit 10 may reduce power consumption.

For this embodiment, in a case where the output voltage Vout of the secondary side circuit 5B is a low voltage in accordance with the PSC signal, there is a case that the operation mode of the printer 1 indicates any one of the standby mode or the off mode. The standby mode and the off mode are operation modes in which power consumption is reduced. As a result, in the standby mode and the off mode, it is not desired that power consumption is increased. Since the switching power supply circuit 10 reduces power consumption in the standby mode or the off mode, it is possible to prevent power consumption from increasing in a case where the operation mode of the printer 1 is the standby mode or the off mode.

In a case where the switch circuit K3 includes a transistor Q2, a resistor R6 and the resistor R7, and the output voltage Vout is equal to or less than the voltage corresponding to a threshold voltage defined by the resistor R6 and the resistor R7, the transistor Q2 performs OFF operation. More specifically, in the switch circuit K3, in a case where the output voltage Vout is equal to or less than 10 volts corresponding to β volts which is the threshold voltage, the transistor Q2 performs OFF operation. Namely, due to the drop of the output voltage Vout, automatically, a current to be supplied to the shunt regulator SR is cut off. Here, a configuration for outputting an off signal from the outside to the base of the transistor Q2 in order to turn off the transistor Q2 is considered. However, even in the configuration for outputting a signal to turn off the transistor Q2 from the outside, power consumption in order to output a signal is necessary. For this case, power consumption is increased in the standby mode or the off mode. In order to control the transistor Q2 from the outside of the switch circuit K3, it is necessary to provide a configuration for controlling the transistor Q2 outside the switch circuit K3. In this embodiment, due to the drop of the output voltage Vout, the transistor Q2 is automatically turned off. Accordingly, in the standby mode or the off mode, it is possible to prevent power consumption from increasing by the switching power supply circuit 10, and it is possible to cut off a current to be supplied to the shunt regulator SR with a simple configuration.

Returning to the description of the timing chart shown in FIG. 4, at a timing t5, the operation mode of the printer 1 is started to shift from the standby mode or the off mode to the normal mode. For example, in a case where the input portion 15 detects an instruction to shift to the normal mode on the basis of user's operation on the operation switch, or in a case wherein the input portion 15 accepts an instruction to execute the operation such as printing in the standby mode, the printer 1 shifts the operation mode from the standby mode to the normal mode. For example, in a case where the input portion 15 detects an instruction to shift to the normal mode on the basis of user's operation on the operation switch, the printer 1 shifts the operation mode from the off mode to the normal mode.

As shown in the timing chart A of FIG. 4, in a case where the operation mode of the printer 1 is started from the standby mode or the off mode to the normal mode, at the timing t5, the SOC 131 stops outputting the PSC signal having the "Low" level to the control terminal ST.

In a case where the SOC 131 stops outputting the PSC signal to the control terminal ST, the control signal circuit K2 stops outputting the PSC signal to the photocoupler Pc. Then, the light-emitting diode Dp constituting the photocoupler Pc stops emitting light, no feedback current flows between the collector and emitter of the phototransistor Qp. The feedback voltage is not applied to the FB terminal, and the control IC 51 controls the pulse to be output to the transistor Q1 so that the voltage applied to the primary winding L1 increases.

If the voltage applied to the primary winding L1 increases, as shown in the timing chart B of FIG. 4, at a timing t6, the output voltage Vout rises from 2 volts. At timing t6, the output voltage Vout rises from 2 volts, as shown in the timing chart C of FIG. 4, the P3 voltage rises from γ volts.

After the timing t6, the output voltage Vout rises from 2 volts. The P3 voltage rises from γ volts after the timing t6 due to the increasing of the output voltage Vout.

After the timing t6, the output voltage Vout rises, and at the timing t7, the output voltage Vout rises to 10 volts. Then, as shown in the timing chart C of FIG. 4, at the timing t7, the P3 voltage rises to β volts.

As described above, in the present embodiment, in a case where the output voltage Vout is 10 volts or less, resistance values of the resistor R6 and resistor R7 are set such that the P3 voltage is a threshold voltage at which the transistor Q2 is turned off. Thus, the P3 voltage rises to a voltage exceeding β volts, as shown in the timing chart D of FIG. 4, at the timing t7, the transistor Q2 performs ON operation. In a case where the transistor Q2 performs ON operation, as shown in the timing chart E of FIG. 4, at a timing t7, power supply to the resistor R3 is turned on.

After the timing t7, the transistor Q2 performs ON operation. After the timing t7, a current flowing to the resistor R3 is turned on. Accordingly, after the timing t7, a current is supplied to the shunt regulator SR, it is possible to perform constant voltage control by the shunt regulator SR.

After the timing t7, the output voltage Vout further rises, and as shown in the timing chart A of FIG. 4, the output voltage Vout rises to 42 volts. Also, at a timing t8, since the P3 voltage is a saturation voltage between the base and the emitter of the transistor Q2, the transistor Q2 performs ON operation. Then, a current flowing to the resistor R3 remains turned on.

As described above, the printer 1 (a printing apparatus) includes the switching power supply circuit 10. The switching power supply circuit 10 includes the primary side circuit 5A that performs a switching operation, the secondary side circuit 5B that has a shunt regulator SR and outputs power to a load 6, the photocoupler Pc (a feedback circuit) that feeds a comparison result between the output voltage Vout output from the secondary side circuit 5B and a reference voltage of the shunt regulator SR back to the primary side circuit 5A to control the output voltage Vout of the secondary side circuit 5B, the control signal circuit K2 that outputs the PSC signal (a control signal) input from the SOC 131 (the outside) to the photocoupler Pc to control the output voltage Vout of the secondary side circuit 5B, and the switch circuit K3 that cuts off a current to be supplied to the shunt regulator SR in a case where the output voltage Vout of the secondary side circuit 5B is a low voltage in accordance with the input of the PSC signal.

As described above, in a case where the output voltage Vout of the secondary side circuit 5B is a low voltage in accordance with the PSC signal, it is unnecessary to control the output voltage Vout by the shunt regulator SR because the output voltage Vout is controlled by a PSC signal. Therefore, in a case where the output voltage Vout of the secondary side circuit 5B is a low voltage in accordance with the PSC signal, the switching power supply circuit 10 includes the switch circuit K3 that cuts off a current to be supplied to the shunt regulator SR. Accordingly, in a case where the output voltage Vout of the secondary side circuit 5B is a low voltage in accordance with the PSC signal, it is possible to prevent a current from being uselessly supplied to the shunt regulator SR. Therefore, in a case where the output voltage Vout of the secondary side circuit 5B is a low voltage in accordance with the PSC signal, it is possible to appropriately control a current to be supplied to the shunt regulator SR by the switching power supply circuit 10.

Further, the printer 1 includes an SOC 131 (a control circuit) that inputs a PSC signal to the control signal circuit K2. In a case where the operation mode of the printer 1 is at least one of the off mode or the standby mode, the SOC 131 outputs the PSC signal to the control signal circuit K2 to cause the output voltage Vout of the secondary side circuit 5B to be the low voltage.

In this manner, in a case where the operation mode of the printer 1 is at least one of the off mode or the standby mode, the SOC 131 outputs the PSC signal to the control signal circuit K2 to cause the output voltage Vout of the secondary side circuit 5B to be the low voltage. As a result, in the case where the operation mode of the printer 1 is at least one of the off mode or the standby mode, it is possible to appropriately control a current to be supplied to the shunt regulator SR by the switching power supply circuit 10.

The switch circuit K3 includes a transistor Q2, a resistor R6 and a resistor R7. In a case where the output voltage Vout of the secondary side circuit 5B is equal to or less than the voltage corresponding to a threshold voltage defined by resistors R6 and R7, the transistor Q2 cuts off a current to be supplied to the shunt regulator SR to decrease a current flowing to the resistor R5.

In this manner, in a case where the output voltage Vout of the secondary side circuit 5B is equal to or less than the voltage corresponding to the threshold voltage defined by resistors R6 and R7, the transistor Q2 cuts off a current to be supplied to the shunt regulator SR. Namely, the switching power supply circuit 10 automatically cuts off a current to be supplied to the shunt regulator SR due to the decrease of the output voltage Vout of the secondary side circuit 5B. As a result, it is unnecessary that the printer 1 includes a configuration for controlling the transistor Q2 from the outside of the switch circuit K3, and there is no power consumption for controlling the transistor Q2. Therefore, it is possible to prevent power consumption from increasing by the switching power supply circuit 10, and it is possible to appropriately control a current to be supplied to the shunt regulator SR with a simple configuration. In the off mode in which the reduction of power consumption is desired, it is possible to prevent power consumption from increasing.

The secondary side circuit 5B is configured to be capable of supplying a constant current to the shunt regulator SR through the resistor R3 (a supply resistor) for supplying the current to the shunt regulator SR. In a case where the output voltage Vout of the secondary side circuit 5B is a low voltage in accordance with the PSC signal, the switch circuit K3 cuts off a current flowing to the resistor R3.

Accordingly, since the current flowing to the resistor R3 is cut off, it is possible to prevent power consumption in the resistor R3. As a result, in a case where the output voltage Vout is a low voltage in accordance with PSC signal input from the SOC 131, it is possible to reduce power consumption of the switching power supply circuit 10 by the switch circuit K3.

The above-mentioned embodiment is merely intended to indicate an aspect of the invention, and may be arbitrarily changed and applied without departing from the scope of the invention.

For example, in the above-mentioned embodiment, the switching power supply circuit 10 is illustrated as a power supply circuit incorporated in the printer 1. However, the switching power supply circuit 10, for example, may be a power supply circuit such as an AC adapter, which is incorporated in a device outside the printer 1. In this case, the PSC signal is to be output to the outside of the printer 1. Even in such a case, the same effects as those in the above-mentioned may be achieved.

For example, in the above-mentioned embodiment, the circuit configuration shown in FIG. 3 is an example, and it is possible to modify the configuration by replacing circuit elements shown in the figure with the same number or the different number of ICs and to arbitrarily change the configuration without departing from the scope of the invention.

The respective functional units shown in FIG. 1 shows a configuration, but a specific implementation is not particularly limited thereto. Namely, it is unnecessary that hardware individually corresponding to respective functional units is implemented, and of course, one processor may execute programs to realize the functions of a plurality of the functional units. Further, some of the functions realized by software in the above-mentioned embodiment may be realized by hardware, or some of the functions realized by hardware may be realized by software. In addition, specific detailed configurations of other respective units of the printer 1 may be arbitrarily changed without departing from the scope of the invention.

For example, in the above-mentioned embodiment, the printer 1 has been illustrated as an ink jet printer but is not limited thereto. For example, the invention also may be adapted to other printers such as a thermal printer, a dot impact printer, and a laser printer.

What is claimed is:

1. A printing apparatus comprising:
    a switching power supply circuit including
        a primary side circuit configured to perform a power switching operation,
        a secondary side circuit having a shunt regulator and configured to output an output voltage to a load side,
        a feedback circuit configured to feed a comparison result between the output voltage of the secondary side circuit and a reference voltage of the shunt regulator back to the primary side circuit to control the output voltage of the secondary side circuit,
        a control signal circuit configured to input a control signal to the feedback circuit to control the output voltage of the secondary side circuit, and
        a switch circuit configured to cut off a current to be supplied to the shunt regulator in a case where the output voltage of the secondary side circuit is decreased in accordance with the control signal,
    the printing apparatus further comprising a control circuit configured to output the control signal to the control signal circuit,
    wherein, in a case where an operation mode is at least one of an off mode or a standby mode, the control circuit outputs the control signal to the control signal circuit to decrease the output voltage of the secondary side circuit.

2. The printing apparatus according to claim 1,
    wherein the switch circuit includes a transistor and a plurality of resistors, and
    the transistor cuts off the current to be supplied to the shunt regulator in a case where the output voltage of the secondary side circuit is equal to or less than a voltage corresponding to a threshold voltage defined by the plurality of resistors.

3. The printing apparatus according to claim 1,
    wherein the secondary side circuit is capable of supplying a constant current to a shunt regulator through a supply resistor for supplying the current to the shunt regulator, and
    the switch circuit cuts off the current flowing to the supply resistor in a case where the output voltage of the secondary side circuit is decreased in accordance with the control signal.

4. A control method of a printing apparatus including switching power supply circuit including a primary side circuit configured to perform a power switching operation, a secondary side circuit having a shunt regulator and configured to output an output voltage to a load side, and a feedback circuit configured to feed a comparison result between the output voltage of the secondary side circuit and the reference voltage of the shunt regulator back to the primary side circuit to control the output voltage of the secondary side circuit, the method comprising:

by switching power supply circuit, inputting a control signal to the feedback circuit to control the output voltage of the secondary side circuit, and cutting off a current to be supplied to the shunt regulator in a case where the output voltage of the secondary side circuit is decreased in accordance with the control signal, wherein the printing apparatus further includes a control circuit configured to output the control signal to the feedback circuit, and wherein the method further comprises:

by the control circuit, outputting the control signal to the feedback circuit to decrease the output voltage of the secondary side circuit in a case where the operation mode of the printing apparatus is at least one of an off mode or a standby mode.

5. A power supply circuit for a printing apparatus, comprising:

a primary side circuit configured to perform a power switching operation, a secondary side circuit having a shunt regulator and configured to output an output voltage to a load side, a feedback circuit configured to feed a comparison result between the output voltage of the secondary side circuit and a reference voltage of the shunt regulator back to the primary side circuit to control the output voltage of the secondary side circuit, a control signal circuit configured to input a control signal to the feedback circuit to control the output voltage of the secondary side circuit, a switch circuit configured to cut off a current to be supplied to the shunt regulator in a case where the output voltage of the secondary side circuit is decreased in accordance with the control signal, and a control circuit configured to output the control signal to the control signal circuit, wherein, in a case where an operation mode is at least one of an off mode or a standby mode, the control circuit outputs the control signal to the control signal circuit to decrease the output voltage of the secondary side circuit.

6. The power supply circuit for the printing apparatus according to claim 5, wherein the switch circuit includes a transistor and a plurality of resistors, and the transistor cuts off the current to be supplied to the shunt regulator in a case where the output voltage of the secondary side circuit is equal to or less than the voltage corresponding to a threshold voltage defined by the plurality of resistors.

7. The power supply circuit for the printing apparatus according to claim 5, wherein the secondary side circuit is capable of supplying a constant current to the shunt regulator through a supply resistor for supplying the current to the shunt regulator, and the switch circuit cuts off the current flowing to the supply resistor in a case where the output voltage of the secondary side circuit is decreased in accordance with the control signal.

* * * * *